(12) United States Patent
Inoko (10) Patent No.: US 8,363,331 B2
(45) Date of Patent: Jan. 29, 2013

(54) ZOOM LENS

(75) Inventor: Kazuhiro Inoko, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 12/970,702

(22) Filed: Dec. 16, 2010

(65) Prior Publication Data

US 2011/0149411 A1 Jun. 23, 2011

(30) Foreign Application Priority Data

Dec. 22, 2009 (JP) ................................ 2009-291024
Oct. 20, 2010 (JP) ................................ 2010-235563

(51) Int. Cl.
*G02B 15/14* (2006.01)
*G02B 9/00* (2006.01)

(52) U.S. Cl. ...................................... 359/680; 359/650

(58) Field of Classification Search .................. 359/649, 359/650, 651, 680, 681, 682
See application file for complete search history.

(56) References Cited

U.S. PATENT DOCUMENTS

| 7,817,345 | B2* | 10/2010 | Inoko | 359/682 |
| 8,077,397 | B2* | 12/2011 | Inoko | 359/682 |
| 2011/0080565 | A1 | 4/2011 | Sugawara et al. | |

FOREIGN PATENT DOCUMENTS

| CN | 102033394 A | 4/2011 |
| JP | 2001-100100 A | 4/2001 |
| JP | 2001-154091 A | 6/2001 |
| JP | 2002-048974 A | 2/2002 |
| JP | 2007-052273 A | 3/2007 |

* cited by examiner

*Primary Examiner* — David N Spector
(74) *Attorney, Agent, or Firm* — Canon U.S.A., Inc. IP Division (57) ABSTRACT

A zoom lens having less distortion and exhibiting good imaging performance is provided. A zoom lens includes a first lens unit provided at the extremity of an enlargement conjugate side and having a negative refractive power, and a final lens unit provided at the extremity of a reduction conjugate side and having a positive refractive power. The final lens unit includes a cemented lens at the extremity of the reduction conjugate side. The cemented lens has a positive refractive power. The zoom lens satisfies specific conditional expressions.

18 Claims, 7 Drawing Sheets

ZOOM LENS

BACKGROUND OF THE INVENTION

1. Field of the Invention

The present invention relates to a zoom lens, and more particularly to a retrofocus zoom lens.

2. Description of the Related Art

A projector is an apparatus that projects an image formed on a personal computer, a video camera, or the like to a large screen for viewing, and is widely used in situations such as meetings, presentations, and movie watching at home. There are several demands on projectors. For example, zoom lenses (projection lenses) intended for projectors are in general desired to have sufficient lengths of back focus, to be telecentric on the reduction conjugate side thereof, and to have less lateral chromatic aberration and less distortion.

Zoom lenses intended for projectors are also desired to have shorter projector distances for the convenience of installation. Accordingly, a retrofocus lens configuration is employed in which, with respect to the stop, a front lens unit provided on the enlargement conjugate side has a negative refractive power and a rear lens unit provided on the reduction conjugate side has a positive refractive power.

A retrofocus lens, however, is asymmetric with respect to the stop and therefore often causes negative distortion and/or lateral chromatic aberration. This particularly applies to projector lenses desired to be telecentric on the reduction conjugate side. As such an asymmetric characteristic become more pronounced, the refractive powers of positive lens elements included in the rear lens unit increase. Consequently, spherical aberration and longitudinal aberration, such as longitudinal chromatic aberration, become more difficult to correct.

With the recent recognition of a problem of television (TV) distortion of the projected image, it is also desired to reduce distortion. Moreover, with a recent increase in resolution, it is desired to suppress chromatic aberration more strictly.

To correct the distortion occurring in a retrofocus lens, it is general to produce positive distortion by providing a positive lens element at a position in the front lens unit where the marginal ray height is large so that rays are converged. In such a configuration, lateral chromatic aberration is also corrected. However, since the level of correction of lateral chromatic aberration varies with the wavelength, rays of short wavelengths tend to be overcorrected.

To solve such a problem, several techniques of correcting the overcorrected lateral chromatic aberration caused by short-wavelength rays are disclosed in which an element causing a large chromatic dispersion is provided at a position in the rear lens unit where the marginal ray height is large.

In Japanese Patent Laid-Open No. 2001-100100, the final lens is made of anomalous high-dispersion glass. However, the effect of correction produced by this technique is limited. In Japanese Patents Laid-Open No. 2001-154091 and No. 2002-048974, a "chromatic" cemented lens is provided as the final lens element. Although this technique may be more effective than the technique disclosed in Japanese Patent Laid-Open No. 2001-100100, the cemented surface is large and the combination of lens elements employed therein causes spherical aberration. Therefore, even if lateral chromatic aberration is reduced, the resolution is not increased. Considering the above, the techniques disclosed in Japanese Patents Laid-Open No. 2001-100100, No. 2001-154091, and No. 2002-048974 do not provide performance sufficient for meeting the recent demands on zoom lenses intended for projectors.

SUMMARY OF THE INVENTION

The present invention provides a zoom lens having less distortion and exhibiting good imaging performance.

According to an aspect of the present invention, a zoom lens includes a first lens unit provided at the extremity of an enlargement conjugate side and having a negative refractive power, and a final lens unit provided at the extremity of a reduction conjugate side and having a positive refractive power. The final lens unit includes a cemented lens at the extremity of the reduction conjugate side. The cemented lens has a positive refractive power and includes a positive lens element and a negative lens element. The zoom lens satisfies the following conditions:

$$v_N - v_P > 0$$

$$n_N - n_P > 0$$

$$2.0 < fe/fw < 6.5$$

where $n_P$ and $v_P$ denote a refractive index and an Abbe number, respectively, of the positive lens element; $n_N$ and $v_N$ denote a refractive index and an Abbe number, respectively, of the negative lens element; fe denotes a focal length of the final lens unit; and fw denotes a focal length of the zoom lens at a wide-angle end.

Further features of the present invention will become apparent from the following description of exemplary embodiments with reference to the attached drawings.

DESCRIPTION OF THE EMBODIMENTS

Embodiments of the present invention will now be described in detail with reference to the attached drawings.

Zoom lenses according to the following embodiments each include a stop, a negative front lens unit provided on an enlargement conjugate side with respect to the stop, and a positive rear lens unit provided on a reduction conjugate side with respect to the stop. In other words, each zoom lens includes a first lens unit having a negative refractive power and provided at the extremity of the enlargement conjugate side, and a final lens unit having a positive refractive power and provided at the extremity of the reduction conjugate side. The rear lens unit (the final lens unit) includes a cemented lens at the extremity of the reduction conjugate side. The cemented lens includes a positive lens element and a negative lens element and, as a whole, has a positive refractive power.

Here, let the refractive index and Abbe number of the positive lens element of the cemented lens be denoted by $n_P$ and $v_P$, respectively, and the refractive index and Abbe number of the negative lens element of the cemented lens be denoted by $n_N$ and $v_N$, respectively. Then, conditions expressed as $v_N > v_P$ and $n_N > n_P$ are satisfied.

Furthermore, the zoom lens is configured to satisfy the following condition on the focal length fe of the final lens unit and the focal length fw of the zoom lens at the wide-angle end:

$$2.0 < fe/fw < 6.5$$

Thus, in the zoom lens according to each of the following embodiments configured as above, even if the back focus is lengthened and the telecentricity on the reduction conjugate side is enhanced, the zoom lens beneficially exhibits good imaging performance with less distortion.

The zoom lens according to each of the following embodiments may include five, six, or more lens units. Specifically, the zoom lens may have any of the following configurations in which, in order from the enlargement conjugate side, five lens units including negative, positive, positive, positive, and positive lens units (third embodiment) or negative, positive, positive, negative, and positive lens units are provided; six lens units including negative, positive, positive, positive, negative, and positive lens units (first embodiment), negative, positive, positive, negative, positive, and positive lens units (second embodiment), or negative, positive, negative, positive, negative, and positive lens units are provided; seven lens units including negative, positive, positive, positive, negative, positive, and positive lens units or negative, positive, positive, positive, positive, negative, and positive lens units are provided; and so forth. In each of such configurations, the rear lens unit corresponds to the first and second lens units or the first to third lens units counted from the reduction conjugate side, and the front lens unit corresponds to the lens units other than those included in the rear lens unit (all lens units on the enlargement conjugate side with respect to the rear lens unit).

First Embodiment

Figure 7:
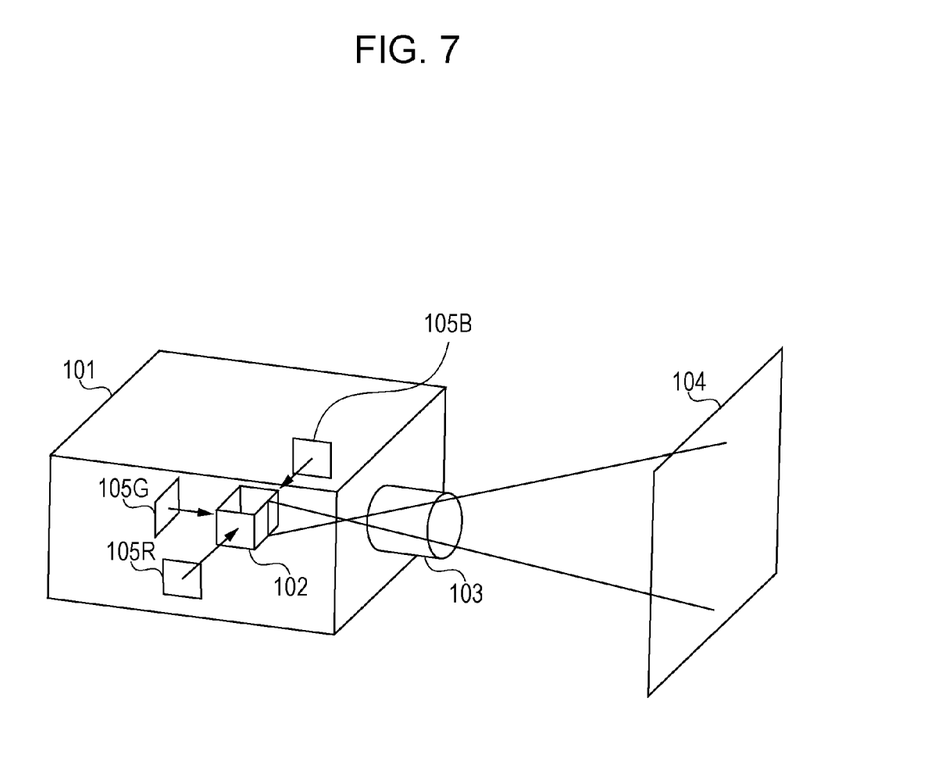
FIG. 7 schematically shows relevant parts of a color liquid-crystal projector.

FIG. 7 schematically shows relevant parts of an image projection apparatus common to all of the following embodiments of the present invention.

The image projection apparatus shown in FIG. 7 is a three-panel, color liquid-crystal projector to which the zoom lens described above is applied. In the apparatus, a plurality of pieces of image information on a plurality of colors based on a plurality of liquid crystal panels are combined by a color combining unit, and the resulting image is enlarged and projected on a screen surface (surface of projection) through the zoom lens.

In a color liquid-crystal projector 101 shown in FIG. 7, red (R), green (G), and blue (B) rays of light from three liquid crystal panels 105R, 105G, and 105B are combined by a color combining unit (prism) 102 so as to travel along a single path, and the combined rays of light is projected on a screen 104 through a zoom lens (projection lens) 103, which is the zoom lens described above.

Figure 1:
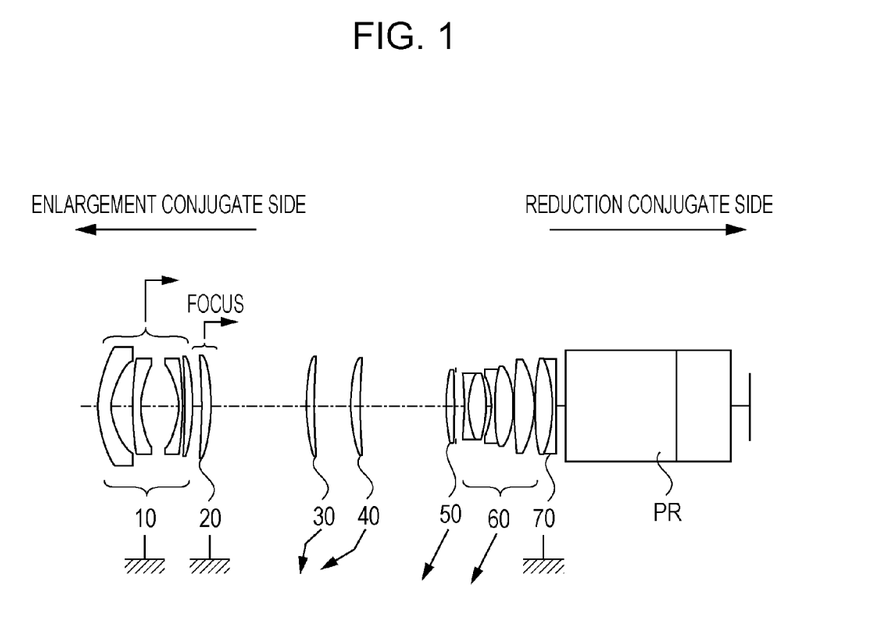
FIG. 1 shows the configuration of a zoom lens according to a first embodiment of the present invention at the wide-angle end.

A zoom lens according to a first embodiment of the present invention included in the image projection apparatus will now be described with reference to the drawings. FIG. 1 is a cross-sectional view showing the configuration of the zoom lens (at the wide-angle end) according to the first embodiment of the present invention. The zoom lens includes six lens units including fifteen lens elements in total. Specifically, the zoom lens includes, in order from the enlargement conjugate side, negative first lens units 10 and 20, a positive second lens unit 30, a positive third lens unit 40, a positive fourth lens unit 50, a negative fifth lens unit 60, and a positive sixth lens unit (final lens unit) 70. The distances between the lens units vary during zooming. Among the fifteen lens elements, the second lens element counted from the enlargement conjugate side is aspherical (on both surfaces). In the first embodiment, when zooming is performed, the first lens units 10 and 20 and the sixth lens unit 70 are stationary, whereas the second to fifth lens units 30 to 60 move. The fourth lens unit 50 is mainly responsible for zooming. When focusing is performed, the first lens units 10 and 20, specifically, a first lens unit 10 and a second first lens unit 20, move such that the distance (relative distance) therebetween is varied. As the focus is changed from an object at infinity toward a near object, the first lens units 10 and 20 move in such a direction that the zoom lens is retracted (toward the reduction conjugate side).

Table 1 summarizes a numerical example corresponding to the first embodiment. In the numerical example, $f_a$ denotes the focal length of the zoom lens, ω denotes the half angle of view, and F denotes the f-number. In Table 1, the surface number denote the number given to each of the surfaces of the lens elements counted in order from the enlargement conjugate side. Furthermore, r denotes the radius of curvature, d denotes the distance between surfaces (the physical distance to the next-numbered surface), and $n_d$ and $v_d$ denote the refractive index for d-line and Abbe number, respectively, of the material of the lens element. The thickness and air gap of the i-th lens element counted from the enlargement conjugate side are shown as di. The surface numbers marked with asterisks (*) means that the surfaces have aspherical shapes in accordance with the following function:

$$x = (y^2/R)/[1 + \{1 - (1+K)(y^2/R^2)\}^{1/2}] + Ay^4 + By^6 + Cy^8 + Dy^{10} + Ey^{12}$$

where y denotes the coordinate in the radial direction, and x denotes the coordinate in the optical-path direction. The coefficients of the aspherical shapes are shown in Table 1.

The distances between surfaces shown as "variable" in Table 1 are variable during zooming or focusing. Although the stop is provided as the seventeenth surface in the first embodiment, the stop may not necessarily be provided in all of the embodiments. That is, a mechanical lens barrel that holds any of the lens elements of the zoom lens may function as a stop, or a position where marginal rays intersect the optical axis may be called a stop. The symbols and suffixes given above are common to all of the embodiments.

The sixth lens unit 70, i.e., the final lens unit, is a cemented lens including, in order from the enlargement conjugate side, a positive lens element and a negative lens element, and is a chromatic lens. Let the Abbe numbers of the positive and negative lens elements included in the cemented lens be denoted by $v_P$ and $v_N$, respectively.

Here, the following conditional expression is to be satisfied:

$$v_N - v_P > 0 \tag{1}$$

More specifically, the following conditional expression is to be satisfied:

$$30.0 > v_N - v_P > 5.0 \tag{1a}$$

The lower limit of Conditional Expression (1a) may be changed to 10.0.

More specifically, the following conditional expression is to be satisfied:

$$20.0 > v_N - v_P > 10.0 \tag{1b}$$

Furthermore, let the refractive indices of the positive and negative lens elements included in the cemented lens (the cemented lens at the extremity of the reduction conjugate side) be denoted by $n_P$ and $n_N$, respectively. Then, the zoom lens according to the first embodiment satisfies the following conditional expression:

$$n_N - n_P > 0 \qquad (2)$$

Such a configuration reduces spherical aberration on the under side occurring markedly in the rear lens unit (provided on the reduction conjugate side with respect to the stop) of a retrofocus lens (a zoom lens including a lens unit having a negative refractive power at the extremity of the enlargement conjugate side). More specifically, the following conditional expression is to be satisfied:

$$0.10 > n_N - n_P > 0.02 \qquad (2a)$$

That is, the sixth lens unit 70 in the first embodiment corrects lateral chromatic aberration with a higher dispersiveness than known glass materials because of the effect of the chromatic characteristic thereof and also reduces spherical aberration because of the effect of the negative refractive power at the cemented surface thereof. Thus, the zoom lens according to the first embodiment exhibits more improved performance than known zoom lenses. The direction of convexity of the cemented surface is also important in improving the performance. At the lens position at the extremity of the reduction conjugate side, the axial ray bundle converges toward the reduction conjugate plane. For such a convergent ray bundle, a cemented surface that is convex toward the reduction conjugate side as in the first embodiment has an effect of causing the ray bundle to diverge more significantly than in other cases even with the same refractive power. Therefore, a greater effect of correction of spherical aberration is produced. In contrast, if a negative lens element and a positive lens element are provided in that order from the large conjugate side, the angle of refraction formed by the axial ray bundle incident on the cemented surface becomes substantially small. Therefore, the amount of spherical aberration on the over side is reduced more than in other cases even with the same negative refractive power. The direction of convexity of the cemented surface may be determined in accordance with the required amount of correction of spherical aberration. In the first embodiment, the cemented surface is convex toward the reduction conjugate side.

Here, let the focal length and Abbe number of the positive lens element included in the cemented lens be denoted by $f_P$ and $v_P$, respectively; the focal length and Abbe number of the negative lens element included in the cemented lens be denoted by $f_N$ and $v_N$, respectively; and the focal length of the cemented lens be denoted by f. Then, the following conditional expression is to be satisfied:

$$\frac{1}{f \cdot \left(\frac{1}{f_p v_p} + \frac{1}{f_n v_n}\right)} < 30 \qquad (3)$$

With a configuration satisfying Conditional Expression (3), a zoom lens realizing the reduction of both distortion and lateral chromatic aberration is provided.

More specifically, the following conditional expression is to be satisfied:

$$11.0 < \frac{1}{f \cdot \left(\frac{1}{f_p v_p} + \frac{1}{f_n v_n}\right)} < 21.0 \qquad (3a)$$

Figure 2:
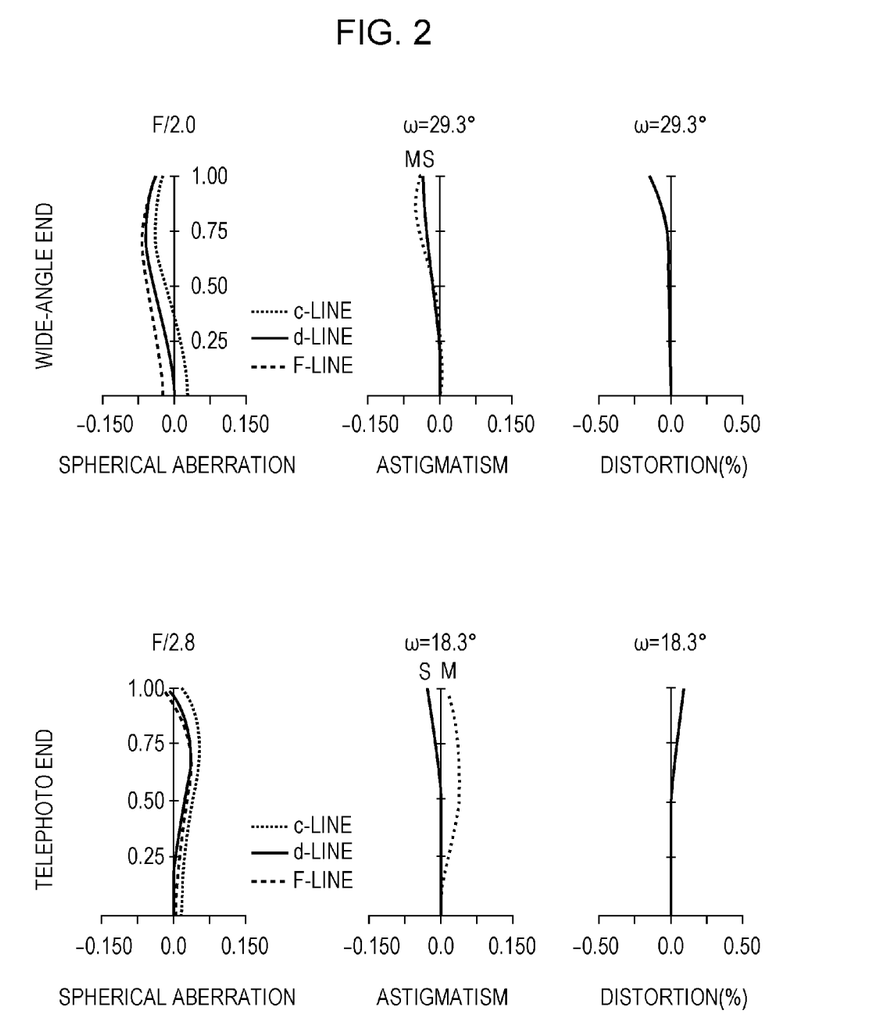
FIG. 2 shows aberrations of the zoom lens according to the first embodiment of the present invention.

In the case of the sixth lens unit 70 according to the first embodiment, $f_P=47.29$, $f_N=-79.11$, and $f=117.37$. Hence, the result of the calculation according to Conditional Expression (3) comes to 14.56. Aberrations of the zoom lens according to the first embodiment are shown in FIG. 2. FIG. 2 demonstrates that distortion is reduced to 0.1% or lower and high performance is realized.

Furthermore, let the focal length of the final lens unit having a positive refractive power and provided at the extremity of the reduction conjugate side be denoted by fe, and the focal length of the zoom lens at the wide-angle end be denoted by fw. Then, the zoom lens according to the first embodiment satisfies the following conditional expression:

$$2.0 < fe/fw < 6.5 \qquad (4)$$

With such a configuration, the zoom lens is provided as a projection lens suitable for projectors that is telecentric on the reduction conjugate side. If the upper limit or the lower limit of Conditional Expression (4) is exceeded, the telecentricity cannot be maintained. That is, principal rays are angled with respect to the optical axis to a nonnegligible extent. In general, the optical element provided at the extremity of the reduction conjugate side of the projection lens (the optical element provided between the projection lens and an image display device) is sensitive to changes in angular characteristics. If Conditional Expression (4) is not satisfied, nonuniformity in color and nonuniformity in contrast occur, for example, resulting in a significant degradation in image quality. Such a zoom lens is not suitable as a projection lens for projectors.

More specifically, the following conditional expression is to be satisfied:

$$2.8 < fe/fw < 5.5 \qquad (4a)$$

$f_a = 23.3$ to $39.4$ (zoom ratio: 1.7)
$\omega = 29.3°$ to $18.3°$
F/2.0 to 2.8

TABLE 1

| Surface data Unit: mm | | | | |
|---|---|---|---|---|
| Surface number | r | d | nd | vd |
| 1 | 44.733 | 5.30 | 1.806 | 33.2 |
| 2 | 22.959 | 8.14 | | |
| 3* | 141.228 | 3.65 | 1.583 | 59.3 |
| 4* | 30.634 | 14.80 | | |
| 5 | −28.975 | 1.75 | 1.496 | 81.5 |
| 6 | −100.843 | 0.54 | | |
| 7 | −242.747 | 3.40 | 1.805 | 25.4 |
| 8 | −71.436 | 3.33 | | |
| 9 | −147.725 | 3.70 | 1.806 | 33.2 |
| 10 | −63.523 | 37.81 | | |
| 11 | 106.121 | 2.80 | 1.487 | 70.2 |
| 12 | 695.425 | Variable | | |
| 13 | 71.148 | 3.60 | 1.834 | 42.7 |
| 14 | 437.970 | Variable | | |
| 15 | 82.379 | 3.00 | 1.496 | 81.5 |
| 16 | −326.102 | 1.26 | | |
| 17 | ∞ | Variable | | |

TABLE 1-continued

Surface data Unit: mm

| | | | | |
|---|---|---|---|---|
| 18 | −92.508 | 1.25 | 1.805 | 25.4 |
| 19 | 26.201 | 7.35 | 1.487 | 70.2 |
| 20 | −40.587 | 2.06 | | |
| 21 | −26.971 | 1.40 | 1.834 | 42.7 |
| 22 | 89.874 | 6.60 | 1.516 | 64.1 |
| 23 | −36.904 | 0.51 | | |
| 24 | 110.525 | 8.80 | 1.496 | 81.5 |
| 25 | −35.376 | Variable | | |
| 26 | 155.701 | 6.00 | 1.808 | 22.7 |
| 27 | −50.379 | 1.80 | 1.834 | 37.1 |
| 28 | −212.697 | 3.10 | | |
| 29 | ∞ | 44.02 | 1.516 | 64.1 |
| 30 | ∞ | 21.00 | 1.805 | 25.4 |
| 31 | ∞ | | | |

| | W | M | T |
|---|---|---|---|
| d10 | 37.81 | 6.56 | 2.71 |
| d12 | 14.13 | 29.55 | 5.00 |
| d14 | 34.33 | 30.21 | 38.65 |
| d17 | 3.00 | 11.08 | 12.20 |
| d25 | 0.51 | 12.37 | 31.20 |

| | W, near | W, infinity | T, near | T, infinity |
|---|---|---|---|---|
| d0 | 1290.00 | 9690.00 | 1290.00 | 9690.00 |
| d8 | 3.89 | 2.76 | 3.89 | 2.76 |
| d10 | 36.89 | 38.74 | 1.80 | 3.64 |

| | K | A | B | C |
|---|---|---|---|---|
| 3 | 0 | 8.194e−06 | −3.001e−08 | 8.121e−11 |
| 4 | 0 | −1.167e−06 | −4.294e−08 | 9.409e−11 |

| | D | E |
|---|---|---|
| 3 | −1.211e−13 | 6.359e−17 |
| 4 | −1.623e−13 | 5.209e−17 |

Second Embodiment

Figure 3:
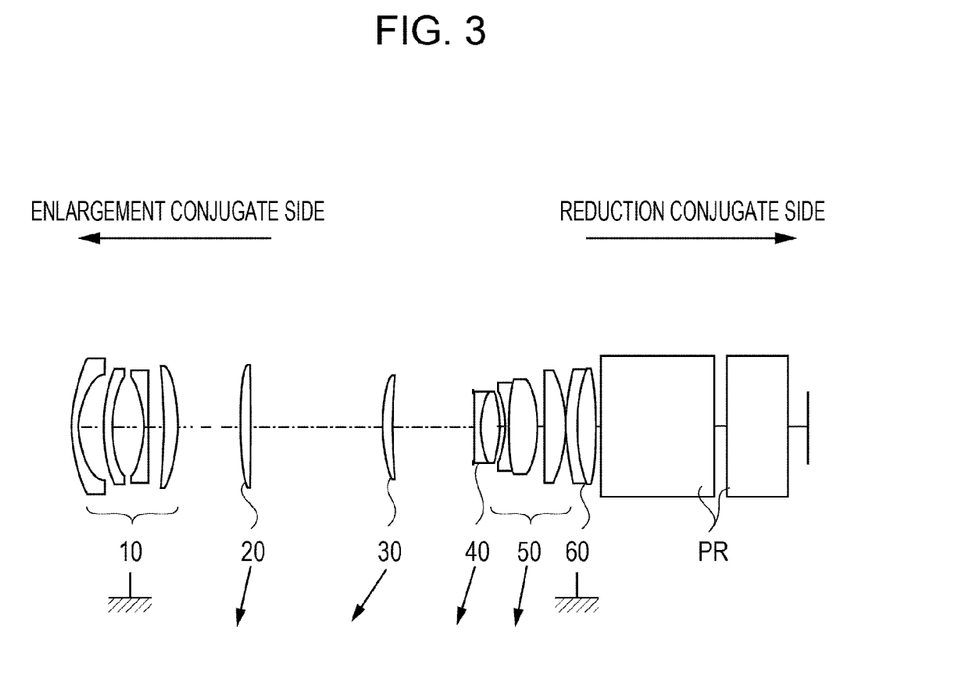
FIG. 3 shows the configuration of a zoom lens according to a second embodiment of the present invention at the wide-angle end.

FIG. 3 is a cross-sectional view of a zoom lens according to a second embodiment of the present invention. Table 2 summarizes a numerical example corresponding to the second embodiment. The zoom lens according to the second embodiment includes six lens units having negative, positive, positive, negative, positive, and positive refractive powers in that order from the enlargement conjugate side. When zooming is performed, second to fifth lens units 20 to 50 move, whereas first and sixth lens units 10 and 60 are stationary (do not move for the purpose of zooming).

The second embodiment differs from the first embodiment particularly in that the final lens unit, which is the sixth lens unit 60 and is a chromatic cemented lens, includes a negative lens element and a positive lens element provided in that order from the enlargement conjugate side. The composite Abbe number ν in the second embodiment is 19.35. Since the refractive power at the cemented surface is negative and because of the reason described above, spherical aberration on the over side occurs. However, since the cemented surface is convex toward the enlargement conjugate side, the amount of spherical aberration is smaller than in the first embodiment. The effect produced by the spherical aberration occurring at the cemented surface can be set in accordance with the direction of convexity of the cemented surface and by considering the overall balance of aberrations.

The other details and effects are the same as those in the first embodiment, and the description thereof is omitted.

Figure 4:
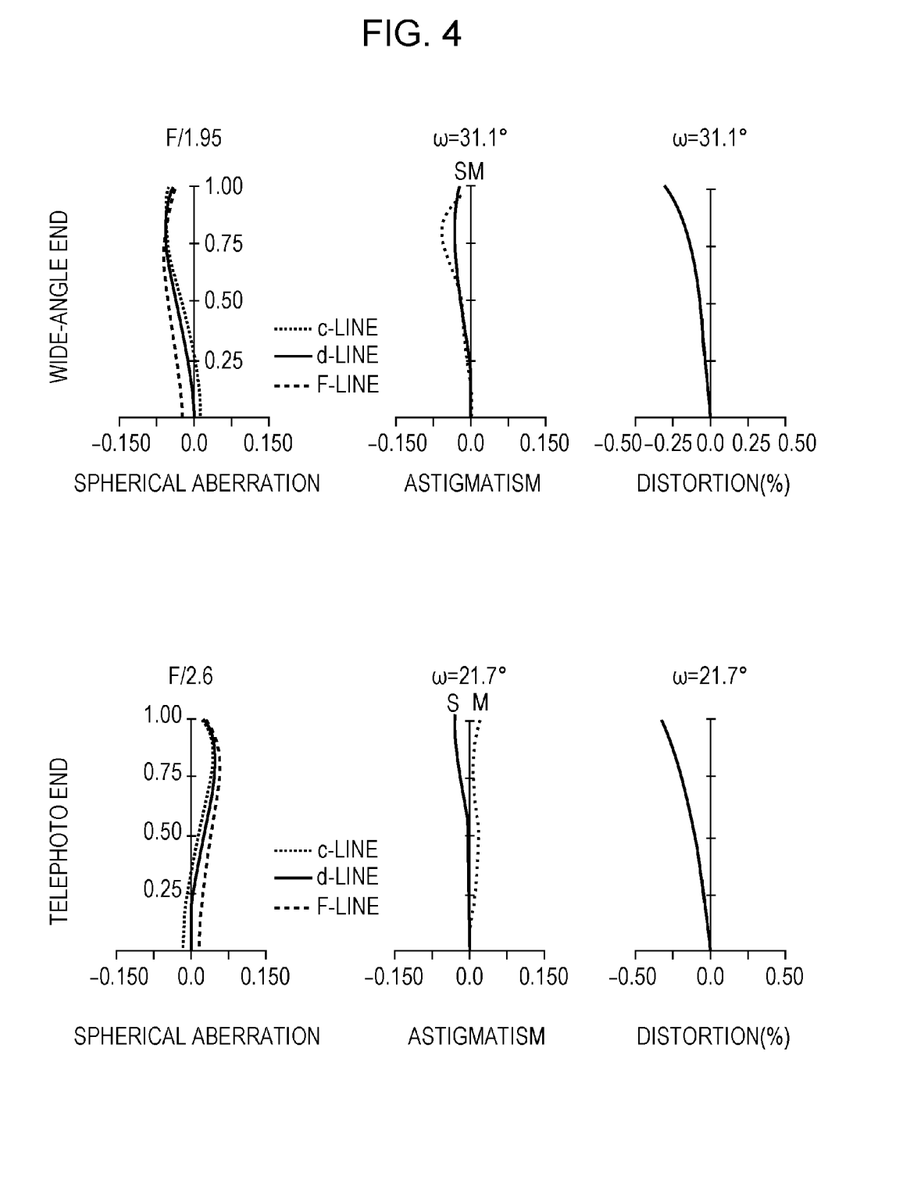
FIG. 4 shows aberrations of the zoom lens according to the second embodiment of the present invention.

Aberrations of the zoom lens according to the second embodiment representing the performance of the zoom lens are shown in FIG. 4.

$f_a$=21.8 to 32.9 (zoom ratio: 1.50)
ω=31.2° to 21.7°
F/1.95 to 2.60

TABLE 2

Surface data Unit: mm

| Surface number | r | d | nd | vd |
|---|---|---|---|---|
| 1 | 47.841 | 2.60 | 1.834 | 42.7 |
| 2 | 25.337 | 9.84 | | |
| 3* | 139.267 | 3.20 | 1.529 | 55.7 |
| 4* | 44.143 | 11.99 | | |
| 5 | −38.207 | 2.00 | 1.696 | 55.5 |
| 6 | −1086.470 | 5.76 | | |
| 7 | −235.045 | 5.36 | 1.721 | 29.2 |
| 8 | −51.727 | 24.19 | | |
| 9 | 139.745 | 4.29 | 1.743 | 44.7 |
| 10 | −273.466 | Variable | | |
| 11 | 61.353 | 4.19 | 1.620 | 36.2 |
| 12 | 1159.348 | 29.49 | | |
| 13 | ∞ | Variable | | |
| 14 | 699.158 | 2.60 | 1.805 | 25.4 |
| 15 | 27.163 | 7.08 | 1.496 | 81.5 |
| 16 | −56.307 | Variable | | |
| 17 | −28.596 | 2.00 | 1.834 | 37.1 |
| 18 | 76.419 | 10.82 | 1.496 | 81.5 |
| 19 | −40.492 | 2.47 | | |
| 20 | 175.285 | 8.95 | 1.496 | 81.5 |
| 21 | −39.526 | Variable | | |
| 22 | 122.688 | 2.60 | 1.834 | 37.1 |
| 23 | 51.258 | 7.60 | 1.805 | 25.4 |
| 24 | −230.663 | 2.50 | | |
| 25 | ∞ | 43.00 | 1.516 | 64.1 |
| 26 | ∞ | 5.00 | | |
| 27 | ∞ | 23.00 | 1.805 | 25.4 |
| 28 | ∞ | | | |

| | W | M | T |
|---|---|---|---|
| d8 | 24.19 | 14.72 | 10.16 |
| d10 | 49.43 | 34.47 | 15.68 |
| d13 | 0.50 | 9.31 | 16.83 |
| d16 | 2.53 | 4.96 | 4.08 |
| d21 | 0.50 | 13.69 | 30.40 |

| | K | A | B | C |
|---|---|---|---|---|
| 3 | 0 | 2.455e−05 | −6.308e−08 | 1.413e−10 |
| 4 | 0 | 2.018e−05 | −7.080e−08 | 1.422e−10 |

| | D | E |
|---|---|---|
| 3 | −1.760e−13 | 9.637e−017 |
| 4 | −1.763e−13 | 6.697e−017 |

Third Embodiment

Figure 5:
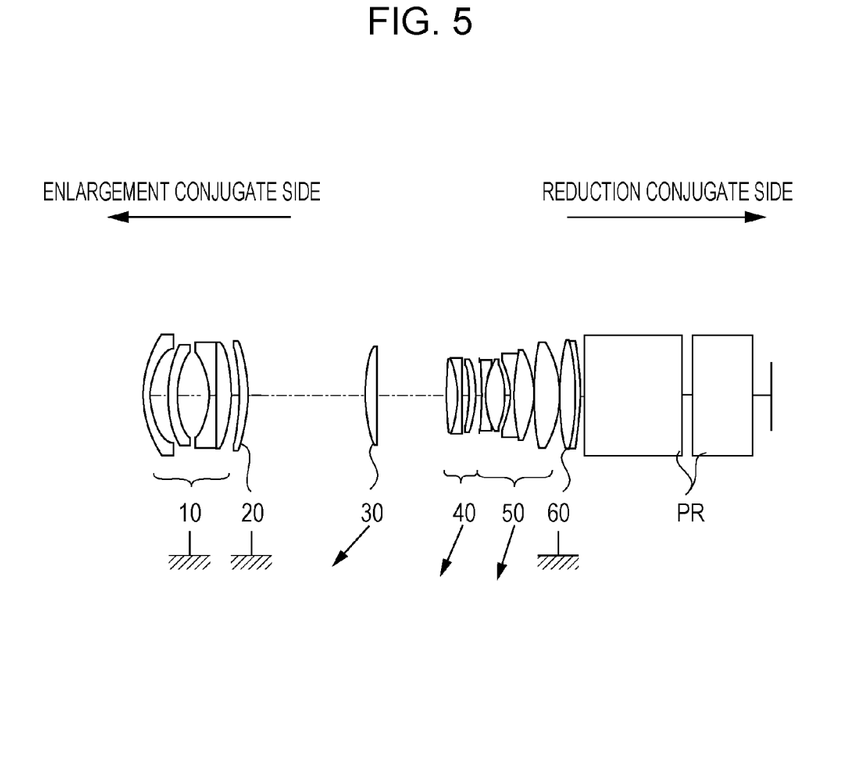
FIG. 5 shows the configuration of a zoom lens according to a third embodiment of the present invention at the wide-angle end.
Figure 6:
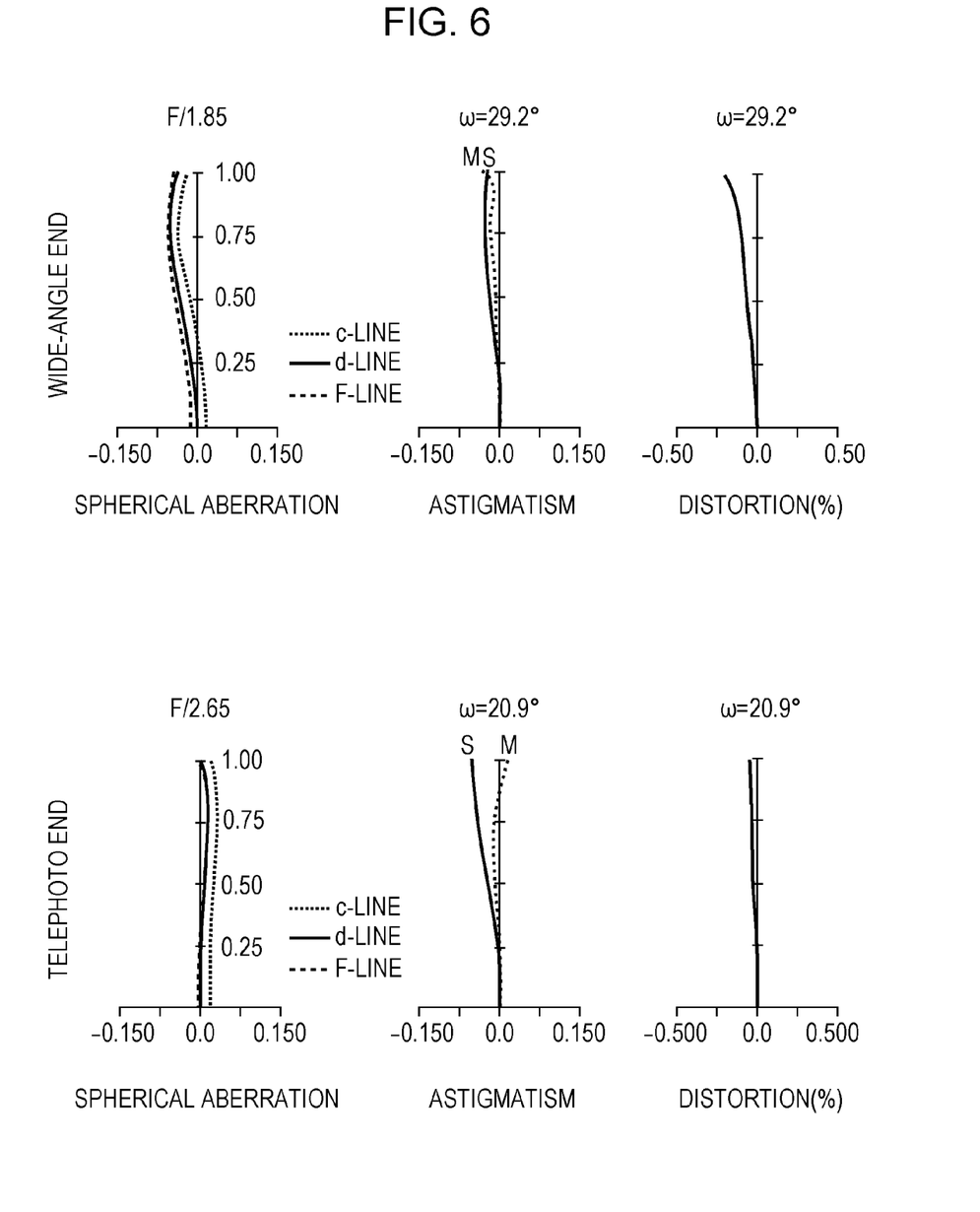
FIG. 6 shows aberrations of the zoom lens according to the third embodiment of the present invention.

FIG. 5 is a cross-sectional view of a zoom lens according to a third embodiment of the present invention. Table 3 summarizes a numerical example corresponding to the third embodiment. The zoom lens according to the third embodiment includes five lens units having negative, positive, positive, positive, and positive refractive powers. When zooming is performed, first lens units 10 and 20 and a fifth lens unit 60 are stationary, whereas second to fourth lens units 30 to 50 move. The first lens unit includes a first lens unit 10 that is stationary during focusing and a second first lens unit 20 that moves in the optical-axis direction during focusing. The fifth lens unit 60 is fixed. The fifth lens unit 60, which is the final lens unit in the third embodiment, employs the combination of a positive lens element and a negative lens element, as in the first embodiment, but with a much larger difference in refractive index between the two lens elements, whereby the amount of spherical aberration on the over side is increased. Thus, the resolution is increased. In the third embodiment, the calculation according to Conditional Expression (3) comes to 20.82. Aberrations of the zoom lens according to the third embodiment at the wide-angle end and at the telephoto end are shown in FIG. 6. The other effects are the same as those in the first embodiment, and the description thereof is omitted.

$f_a$=21.8 to 32.0 (zoom ratio: 1.47)

$\omega$=29.2° to 20.9°

F/1.85 to 2.65

TABLE 3

Surface data Unit: mm

| Surface number | r | d | nd | vd |
|---|---|---|---|---|
| 1 | 35.781 | 2.00 | 1.805 | 25.4 |
| 2 | 20.535 | 7.30 | | |
| 3* | 138.000 | 3.20 | 1.529 | 55.7 |
| 4* | 33.542 | 11.42 | | |
| 5 | −25.087 | 1.70 | 1.487 | 70.2 |
| 6 | 1288.355 | 5.09 | 1.799 | 29.8 |
| 7 | −51.314 | 3.47 | | |
| 8 | −79.111 | 3.14 | 1.772 | 49.5 |
| 9 | −51.574 | 41.44 | | |
| 10 | 56.109 | 4.49 | 1.806 | 33.2 |
| 11 | −568.170 | Variable | | |
| 12 | 73.725 | 4.80 | 1.487 | 70.2 |
| 13 | −36.162 | 1.20 | 1.749 | 35.2 |
| 14 | 227.899 | 2.25 | | |
| 15 | −59.178 | 2.57 | 1.805 | 25.4 |
| 16 | −40.631 | 0.50 | | |
| 17 | ∞ | Variable | | |
| 18 | −98.437 | 1.20 | 1.799 | 29.8 |
| 19 | 25.622 | 6.85 | 1.516 | 64.1 |
| 20 | −41.740 | 2.22 | | |
| 21 | −23.114 | 1.30 | 1.749 | 35.2 |
| 22 | 66.923 | 6.88 | 1.496 | 81.5 |
| 23 | −35.001 | 0.20 | | |
| 24 | 130.470 | 8.63 | 1.496 | 81.5 |
| 25 | −33.266 | Variable | | |
| 26 | 91.379 | 5.21 | 1.805 | 25.4 |
| 27 | −78.774 | 1.50 | 1.882 | 40.7 |
| 28 | −220.673 | 1.30 | | |
| 29 | ∞ | 34.60 | 1.516 | 64.1 |
| 30 | ∞ | 4.00 | | |
| 31 | ∞ | 21.00 | 1.805 | 25.4 |
| 32 | ∞ | | | |

| | W | M | T |
|---|---|---|---|
| d9 | 41.44 | 28.45 | 14.77 |
| d11 | 24.10 | 24.19 | 15.82 |
| d17 | 1.64 | 5.67 | 19.32 |
| d25 | 0.70 | 9.57 | 17.96 |

| | W, near | W, infinity | T, near | T, infinity |
|---|---|---|---|---|
| d0 | 1200.00 | 8700.00 | 1200.00 | 8700.00 |
| d7 | 4.10 | 2.82 | 4.10 | 2.82 |
| d9 | 40.81 | 42.09 | 14.14 | 15.43 |

| | K | A | B | C |
|---|---|---|---|---|
| 3 | 0 | 2.631e−05 | −7.460e−08 | 1.998e−10 |
| 4 | 0 | 1.737e−05 | −8.373e−08 | 1.339e−10 |

| | D | E |
|---|---|---|
| 3 | −2.398e−13 | 5.347e−17 |
| 4 | 1.969e−14 | −6.487e−16 |

The results of calculations according to Conditional Expressions (1) to (4) for Numerical Examples 1 to 3 are summarized in Table 4 below.

TABLE 4

| | EXAMPLE 1 | EXAMPLE 2 | EXAMPLE 3 |
|---|---|---|---|
| EXPRESSION (1) | 14.4 | 11.7 | 15.3 |
| EXPRESSION (2) | 0.026 | 0.029 | 0.077 |
| EXPRESSION (3) | 14.56 | 19.35 | 20.82 |
| EXPRESSION (4) | 4.98 | 4.74 | 3.87 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-291024 filed Dec. 22, 2009, which is hereby incorporated by reference herein in its entirety.

What is claimed is:

1. A zoom lens comprising:
   a first lens unit provided nearest to an enlargement conjugate side and having a negative refractive power; and
   a final lens unit provided at nearest to a reduction conjugate side and having a positive refractive power, the final lens unit including a cemented lens provided nearest to the reduction conjugate side, the cemented lens having a positive refractive power and including a positive lens element and a negative lens element,
   wherein the zoom lens satisfies the following conditions:

$$\nu_N - \nu_P > 0$$

$$n_N - n_P > 0$$

$$2.0 < fe/fw < 4.74$$

where $n_P$ and $\nu_P$ denote a refractive index and an Abbe number, respectively, of the positive lens element; $n_N$ and $\nu_N$ denote a refractive index and an Abbe number, respectively, of the negative lens element; fe denotes a focal length of the final lens unit; and fw denotes a focal length of the zoom lens at a wide-angle end.

2. The zoom lens according to claim 1, wherein the positive lens element is provided on the enlargement conjugate side with respect to the negative lens element.

3. The zoom lens according to claim 1, wherein the negative lens element is provided on the enlargement conjugate side with respect to the positive lens element.

4. The zoom lens according to claim 1, wherein the cemented lens is stationary during zooming.

5. The zoom lens according to claim 1,
   wherein the first lens unit and the final lens unit are stationary during zooming, and
   wherein zooming is performed by moving at least one lens unit provided between the first lens unit and the final lens unit.

6. The zoom lens according to claim 1, satisfying the following condition:

$$\nu_N - \nu_P > 5.0$$

7. The zoom lens according to claim 1, satisfying the following condition:

$$\frac{1}{f \cdot \left(\frac{1}{f_p v_p} + \frac{1}{f_n v_n}\right)} < 30$$

where f denotes a focal length of the cemented lens, $f_P$ denotes a focal length of the positive lens element, and $f_N$ denotes a focal length of the negative lens element.

8. An image projection apparatus comprising:
the zoom lens according to claim 1; and
an image display device provided on the reduction conjugate side with respect to the zoom lens,
wherein light from the image display device is projected on a surface of projection through the zoom lens.

9. A zoom lens comprising:
a first lens unit provided nearest to an enlargement conjugate side and having a negative refractive power; and
a final lens unit provided at nearest to a reduction conjugate side and having a positive refractive power, the final lens unit including a cemented lens provided nearest to the reduction conjugate side, the cemented lens having a positive refractive power and including a positive lens element and a negative lens element,
wherein the zoom lens satisfies the following conditions:

$v_N - v_P > 0$ $n_N - n_P > 0$ $2.0 < fe/fw < 6.5$ where $n_p$ and $V_p$ denote a refractive index and an Abbe number, respectively, of the positive lens element; $n_N$ and $v_N$ denote a refractive index and an Abbe number, respectively, of the negative lens element; fe denotes a focal length of the final lens unit;
and fw denotes a focal length of the zoom lens at a wide-angle end,
wherein the zoom lens includes a total of 5 lens units including the first and final lens units.

10. The zoom lens according to claim 9, wherein the positive lens element is provided on the enlargement conjugate side with respect to the negative lens element.

11. The zoom lens according to claim 9, wherein the negative lens element is provided on the enlargement conjugate side with respect to the positive lens element.

12. The zoom lens according to claim 9, wherein the cemented lens is stationary during zooming.

13. The zoom lens according to claim 9, wherein the first lens unit and the final lens unit are stationary during zooming, and wherein zooming is performed by moving at least one lens unit provided between the first lens unit and the final lens unit.

14. The zoom lens according to claim 9, satisfying the following condition:

$v_N - v_P > 5.0$.

15. The zoom lens according to claim 9, satisfying the following condition:

$$\frac{1}{f \cdot \left(\frac{1}{f_p v_p} + \frac{1}{f_n v_n}\right)} < 30$$

where f denotes a focal length of the cemented lens, $f_p$ denotes a focal length of the positive lens element, and $f_N$ denotes a focal length of the negative lens element.

16. An image projection apparatus comprising:
the zoom lens according to claim 9; and
an image display device provided on the reduction conjugate side with respect to the zoom lens,
wherein light from the image display device is projected on a surface of projection through the zoom lens.

17. A zoom lens comprising:
a first lens unit provided nearest to an enlargement conjugate side and having a negative refractive power; and
a final lens unit provided at nearest to a reduction conjugate side and having a positive refractive power, the final lens unit including a cemented lens provided nearest to the reduction conjugate side, the cemented lens having a positive refractive power and including a positive lens element and a negative lens element,
wherein the zoom lens satisfies the following conditions:

$v_N - v_P > 0$ $n_N - n_P > 0$ $2.0 < fe/fw < 6.5$ where $n_p$ and $V_p$ denote a refractive index and an Abbe number, respectively, of the positive lens element; $n_N$ and $v_N$ denote a refractive index and an Abbe number, respectively, of the negative lens element; fe denotes a focal length of the final lens unit;
and fw denotes a focal length of the zoom lens at a wide-angle end, wherein the zoom lens includes a total of 6 lens units including the first and final lens units.

18. A zoom lens comprising:
a first lens unit provided nearest to an enlargement conjugate side and having a negative refractive power; and
a final lens unit provided at nearest to a reduction conjugate side and having a positive refractive power, the final lens unit including a cemented lens provided nearest to the reduction conjugate side, the cemented lens having a positive refractive power and including a positive lens element and a negative lens element,
wherein the zoom lens satisfies the following conditions:

$v_N - v_P > 0$ $n_N - n_P > 0$ $2.0 < fe/fw < 6.5$ where $n_p$ and $V_p$ denote a refractive index and an Abbe number, respectively, of the positive lens element; $n_N$ and $v_N$ denote a refractive index and an Abbe number, respectively, of the negative lens element; fe denotes a focal length of the final lens unit;
and fw denotes a focal length of the zoom lens at a wide-angle end,
wherein the zoom lens includes more than 7 lens units including the first and final lens units.

* * * * *